PARALLEL-TO-SERIAL CONVERTER APPARATUS

Filed Jan. 11, 1960 3 Sheets-Sheet 1

INVENTORS G. W. FREDERICKS
W. J. LAMNECK
BY
ATTORNEY

PARALLEL-TO-SERIAL CONVERTER APPARATUS

Filed Jan. 11, 1960 3 Sheets-Sheet 2

INVENTORS G.W. FREDERICKS
W.J. LAMNECK
BY
[signature]
ATTORNEY

May 14, 1963 G. W. FREDERICKS ETAL 3,090,034

PARALLEL-TO-SERIAL CONVERTER APPARATUS

Filed Jan. 11, 1960 3 Sheets-Sheet 3

INVENTORS G. W. FREDERICKS
W. J. LAMNECK
BY James Falk
ATTORNEY

United States Patent Office 3,090,034
Patented May 14, 1963

3,090,034

PARALLEL-TO-SERIAL CONVERTER APPARATUS

George W. Fredericks, Woodhaven, and William J. Lamneck, Jamaica, N.Y., assignors to Bell Telephone Laboratories, Incorporated, New York, N.Y., a corporation of New York Filed Jan. 11, 1960, Ser. No. 1,739
20 Claims. (Cl. 340—172.5)

Figure 1:
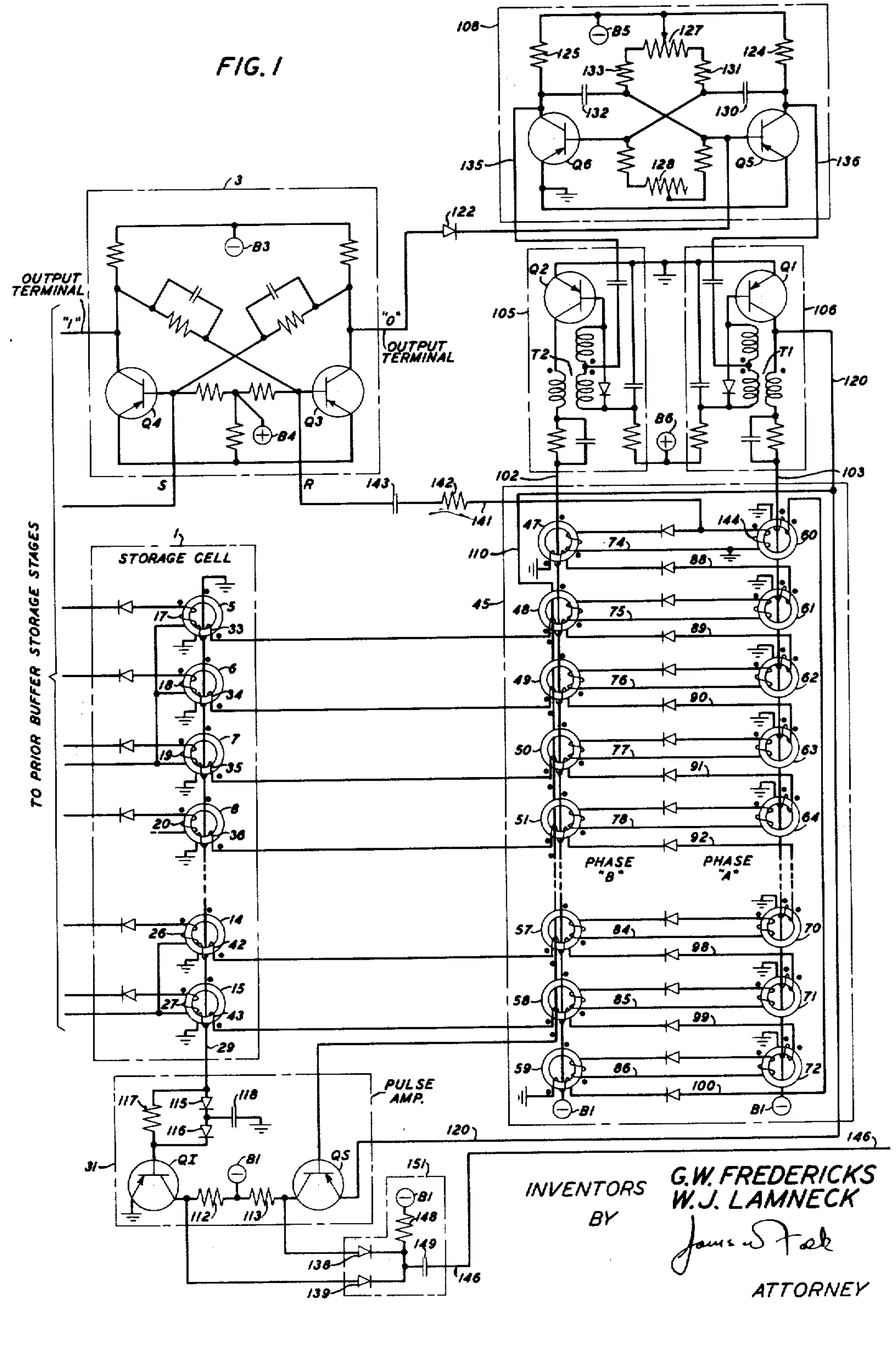

This invention relates to parallel-to-serial converter and output circuits and more particularly to such circuits employing remanently magnetic cores for incorporation in traffic measuring apparatus for converting statstical data accumulated in parallel form to a serial form for recording on a final storage medium.

The present demand for telephone service has necessitated that management secure the most efficient use of existing plant facilities to maintain a satisfactory and balanced grade of service to all subscribers. In addition, management must formulate investment policies with respect to expansion or contraction of plant facilities in anticipation of future traffic trends in order to perpetuate this same grade of service. Accordingly, management is obliged to exercise a close operational control over existing plant facilities and to ascertain future traffic trends to be accommodated in order to continuously provide such grade of service consistent with economy of operation. Such obligation can only be satisfied by conducting repeated traffic studies to determine the present and future adequacy or inadequacy of plant facilities with respect to the amount of traffic to be supported thereby.

Generally, statistical data for purposes of traffic studies is initially accumulated by traffic monitoring apparatus in a form which is identifiable on an immedate basis as relevant to a plurality of units of equipment to be studied. For example, statistical data normally appears as electrically indistinguishable pulse indications directed from the traffic monitoring apparatus along particular leads which are peculiarly identifiable with either an individual one or a group of selected ones of a plurality of units of equipment to be studied. It is evident that, as each of the pulse indications is of finite duration, the information represented thereby is lost and not available for traffic studies unless such indications are either immediately processed or recorded in some way for later processing. Heretofore, when an immediate processing has not been feasible, manual-visual methods of accumulating and recording statistical data have been employed. However, the shortcomings of such methods are evident as considerable time and energy must be expended by human agents in compiling, indexing and converting such data to a form processable by automatic data processing equipment. For example, the statistical data so accumulated has been converted to perforations appearing on individual cards or recorded information appearing on a magnetic tape storage medium for processing by automatic data processing equipment. To avoid such shortcomings, present day traffic monitoring circuits now include encoder or translator devices for immediately converting the electrically indistinguishable pulse indications directed along the particular leads to an equivalent binary notation particularly designating the particular unit of equipment to which it is relevant. Accordingly, the statistical data in the form of binary code notations is directed in parallel from the traffic monitoring circuits in a form which is directly recordable and processable by automatic data processing equipment.

The desirability of recording statistical data so accumulated on a storage medium is predicated upon the high cost of automatic data processing equipment and the economies realized if one such equipment is common to or adapted to process statistical data which has been accumulated at a plurality of locations. As the availability of the common automatic data processing equipment to each of the plurality of locations is limited, the statistical data accumulated thereat must necessarily be recorded in an unmutilated condition to allow for a processing thereof by such common equipment at a later time. To avoid certain data storage and transmission problems, the statistical data is normally recorded in serial form. Accordingly, a parallel-to-serial converter is normally employed whereby the statistical data as equivalent binary code notations directed from the traffic monitoring circuit is converted to a serial form to allow for a serial recording thereof. However, it is requisite that an accurate conversion is had so that the statistical data processed by the automatic traffic data equipment is identical to the statistical data which has been accumulated by the traffic monitoring circuits.

Accordingly, an object of this invention is to provide a parallel-to-serial converter and more specifically such a converter which may be advantageously incorporated as an integral part of a traffic measurement apparatus.

Another object of this invention is to provide an improved parallel-to-serial converter apparatus which is simple, economical and compact in construction and yet reliable in operation.

Another object of this invention is to provide a parallel-to-serial converter apparatus which is operative to provide that a binary word directed thereto in parallel be converted in a serial form and directly recordable on a storage medium on a self-clocking nonreturn-to-zero basis.

A further object of this invention is to provide a parallel-to-serial converter apparatus employing square-loop magnetic core elements as storage devices which is operative to suppress noise pulses, due to a shuttling of such magnetic cores upon the storage in parallel of a binary code notation therein, from affecting the operation of a subsequent serial recorder apparatus.

It is still a further object of this invention that a parallel-to-serial converter and output circuit provide both serial information pulses and synchronizing or clock pulses between the occasions of the information pulses. More specifically an object of this invention is an improved circuit of the type just specified wherein false occurrence of clock pulses is prevented.

These and other objects of this invention are achieved by the provision of a converter circuit including a two-phase square-loop magnetic core shift register for converting to a serial form a binary word which has been stored in parallel in a storage cell comprising a plurality of square-loop magnetic cores; the converter further includes amplifiers which are insensitive to, or, in effect, operate to suppress, noise pulses due to the shuttling of the magnetic cores in both the converter and storage cell. According to one illustrative embodiment of this invention, the converter is operative to convert, in turn, binary words successively directed to and stored in parallel in the storage cell magnetic cores to a form recordable on a magnetic tape storage medium on a self-clocking nonreturn-to-zero basis.

As is well known, a setting of a magnetic core is productive of a first directional magnetic flux change and a subsequent second directional magnetic flux change due to a shuttling thereof to its remanent magnetic state. Therefore, a storage in parallel of a binary word in the storage cell magnetic cores through which is threaded a common sense winding results in the development of a first voltage across such winding during the simultaneous setting of the selected ones thereof in accordance with the binary code and, subsequently, a proportionately smaller second voltage or noise pulse of opposite polarity thereacross due to the core shuttlings. The first and second developed voltages are additive effects of the selected ones of the storage cell magnetic cores along the sense winding.

To provide for the serial development of information pulses, the sense winding is connected to an information pulse amplifier and specifically as a closed loop across the emitter-base circuit of a transistor of conductivity type as to be forward biased by the voltage developed thereacross upon the interrogation and accompanying resetting of one of the selected ones of the storage cell magnetic cores; however, the above-mentioned second voltage or noise pulse is of the same polarity as that voltage developed across the sense winding at this time. Accordingly, on the storage in parallel of a binary word whereby a large portion of the storage cell magnetic cores are simultaneously set and subsequently shuttled, the noise pulse due to the latter can cause a spurious operation of the information pulse amplifier and the generation of an improper information pulse. However, in accordance with an aspect of our invention, to render the information pulse amplifier insensitive to such noise pulses, a noise suppressor circuit is provided to insure that the amplifier transistor is temporarily and sufficiently reverse biased upon the appearance of each of the noise pulses due to core shuttlings along the first sense winding. The noise suppressor circuit includes a capacitor device which is adapted to be charged upon the appearance of the first developed voltage across the common sense winding and, thereupon, discharged along a discharge path electrically integral with the base electrode of the transistor amplifier and which path includes the common sense winding as threaded through the storage cell magnetic cores. As the first developed voltage is of plurality as to reverse bias the information pulse amplifier, the voltage appearing along the discharge path of the capacitor, therefore, provides a reverse biasing potential to the base electrode of the information pulse amplifier. The time constant of the discharge path is selected such as to insure that the reverse potential appearing at the base electrode of the information pulse amplifier during the development of the noise pulse due to the core shuttlings in the storage cell is sufficient to overcome the forward biasing effects of such noise pulses. Accordingly, a spurious operation of the information pulse amplifier by such noise pulses is prevented.

Further and in accordance with our invention, each of the storage cell magnetic cores is adapted to be successively interrogated by the operation of a recycling two-phase magnetic core shift register. The first and second phases of the shift register include a plurality of corresponding square-loop magnetic cores which are paired in a plurality of steps corresponding one to each of the storage cell magnetic cores plus a first and a last step corresponding to time spaces to precede and follow each serially directed binary word. Transfer circuits are provided within the shift register to connect each of the first phase magnetic cores to the corresponding second phase magnetic cores; similarly, transfer circuits are provided to connect each second phase magnetic core to that first phase magnetic core included in the next successive step. To provide for the successive transfers in phase of the shift register, a core driver circuit is provided to each of the first and the second phases thereof. An astable control circuit is further provided for alternately operating each of the core drivers; however, the astable control circuit is adapted to be operative only during that time in which the storage cell is in a storage condition.

Accordingly, to step the shift register, successive transfers in phase thereof are affected by the first and second phase core drivers, respectively, whereby a particular one of the second phase magnetic cores is first set and then reset. Upon each stepping operation of the shift register, therefore, first directional and second directional magnetic flux changes are produced in the particular second phase magnetic core upon the setting and resetting thereof, respectively, each of the directional changes being followed by opposite directional magnetic flux changes due to core shuttlings. In accordance with our invention the first directional magnetic flux change causes the shift register to supply the necessary clocking pulses to allow a recording of the serially directed binary word on a self-clocking basis, while the second directional magnetic flux change provides for successive interrogation of the storage cell magnetic cores.

A sense winding is also threaded on a single-turn basis through those second phase magnetic cores included in those steps corresponding to the storage cell magnetic cores. This sense winding is connected to a clock pulse amplifier and specifically as a closed loop across the emitter-base circuit of a transistor of conductivity type to be forward biased by the voltage developed thereacross by the first directional magnetic flux change produced in that one of the second phase magnetic cores being set. Accordingly, except in the first and last steps, each transfer of the shift register from the first phase to the second phase and the resultant setting of a particular second phase magnetic core operates to forward bias this transistor amplifier to provide for the regular development of clock pulses. The subsequent voltage developed across the sense winding by the small directional magnetic flux change due to the shuttling of the particular second phase magnetic core is of improper polarity to forward bias the clock pulse amplifier.

To effect successive interrogations of the plurality of storage cell memory cores, a read winding is provided to each storage cell magnetic core which is included in that transfer circuit connecting the second phase magnetic core in the corresponding step of the shift register to the first phase magnetic core in the next successive step thereof; each of these transfer circuits is adapted to be energized by a second directional magnetic flux change produced upon a resetting of the second phase magnetic core. However, during a transfer of the shift register from the second phase to the first phase, the operation of the core driver provided to the second phase is effective not only to reset the particular second phase magnetic core but is, also, effective to shuttle the remaining second phase magnetic cores therein to produce a first directional magnetic flux change in each upon application of drive current, and to produce a second directional magnetic flux change in each upon cessation of drive current. Accordingly, the voltage developed across the sense winding by this first directional flux change is of improper polarity to forward bias the clock pulse amplifier. However, the voltage developed across the sense winding by the second directional magnetic flux changes in each of the second phase magnetic cores is additive and of proper polarity to forward bias the transistor of the clock pulse amplifier. Therefore, to prevent a spurious operation of the clock pulse amplifier, the amplifier is maintained in an inhibited state during such time that the first phase core driver apparatus is in a quiescent state. Thus, the clock-pulse amplifier is only operative during the operation of the first phase core driver apparatus in transferring the shift register to the second phase whereupon clock pulses are developed. Therefore, noise pulses due to core shuttling in the second phase magnetic cores are not effective to forward bias the clock pulse amplifier.

Upon the successive interrogations of the magnetic cores in the storage cell having been completed, the shift register is adapted to recyle and normalize whereupon the astable control circuit for operating the core driver apparatus is again inhibited until a next subsequent binary word is stored in parallel in the storage cell.

The alternately appearing outputs of the information-pulse and the clock-pulse amplifiers are directed each to one input of an OR gate circuit, the output of which is directed to a transmit amplifier. The transmit amplifier is responsive to each output of the OR gate circuit to provide a reversible current output to a recording head winding or to the primary winding of a transformer for transmission thereof along a transmission cable to a distant location. The binary word is transmitted along the cable as a series of abrupt alternate changes in cable current, the amplitude and rate of change of each of the abrupt changes being fairly uniform. Accordingly, by using a relatively low impedance transformer at the cable terminal at the distant location, a differentiated version of the binary word as transmitted along the cable is had. This differentiated version of the binary word is directed to a bipolar amplifier which includes a network circuit to suppress any response thereof to overshoot and, in turn, controls a write amplifier. The write amplifier is operative to provide a reversible current output to a recording head winding or to the primary winding of another transformer for transmission of the same binary word to a more distant location along another transmission cable.

It is a feature of our invention that a two-phase magnetic core shift register be included in a parallel-to-serial converter and output circuit for successively interrogating a plurality of square loop magnetic cores comprising a storage cell in which information is stored in parallel.

It is another feature of our invention that a first sense winding is threaded through the parallel storage magnetic cores and a second sense winding is threaded through certain of the cores in one phase of the shift register, each of the sense windings being connected to a separate pulse amplifier for the generation of information and interlaced clock or synchronizing pulses. More specifically, in accordance with this feature of our invention, the amplifiers are connected in the circuit to be insensitive to or, in effect, operate to suppress, noise pulses appearing on the sense windings due to shuttlings of the associated magnetic cores.

A further feature of this invention is in the inclusion of a noise suppressor circuit connected between the storage cell sense winding and the information pulse amplifier, which circuit is operative to maintain the information amplifier in a reverse-biased condition upon the appearance of noise pulses along the sense winding, such noise pulses being due to shuttling of the magnetic cores in the storage cell on the storage of a binary word therein. More specifically in accordance with this feature of our invention and in one specific illustrative embodiment thereof, a pair of similarly poled diodes are connected in series between the sense winding and the base of a transistor in the pulse amplifier, a resistor is connected in shunt across the serially connected diodes, and a capacitor is connected to the point of connection between the two diodes, the capacitor charging rapidly to a voltage to reverse-bias the transistor upon the storage of information in the magnetic cores and discharging relatively slowly during the generation of the error or noise pulses on the immediately subsequent shuttling of the cores, whereby the reverse bias voltage provided by the capacitor prevents enablement of the transistor by the forward biasing noise pulses due to shuttling of the cores.

Still another feature of this invention relates to the successive energization of first and second transfer circuits to second phase magnetic cores in a shift register circuit, the setting of the second phase cores on energization of the first transfer circuits causing the development of the clock or synchronizing pulses and the resetting of the second phase magnetic cores to energize the second transfer circuits causing resetting of the storage cores in the storage cell for generation of the information pulses. Thus it is a feature of this invention that at least certain of the second transfer circuits each include an output winding of the second phase mangetic core and an input winding on both a first phase magnetic core in the shift register circuit and a storage magnetic core in the storage cell.

Yet another feature of this invention relates to the inhibition of the clock pulse amplifier connected to the sense winding through the second phase magnetic cores except during driving of the first phase magnetic cores to set one of the second phase magnetic cores in the shift register.

And yet another feature of this invention relates to the provision of a core driver circuit for each phase of the two-phase magnetic core shift register and normally operative control circuitry therefor to provide alternate operation of the core driver circuits, such control circuitry being inhibited during a nonstorage condition of the storage cell.

A further feature of this invention relates to the provision of a transmit amplifier responsive to each operation of the information pulse and clock pulse amplifiers to provide a reversible current output through either a recorder head winding or a primary winding of a transformer for transmitting the binary word present in a self-clocking nonreturn to zero form along a transmission cable to a distant location. Further, a transformer of selected low inductance is provided at the distant location to provide a form of differentiation in order to extract, in usable form, the desired information from the normally distorted binary word signal.

And yet still another feature of this invention relates to the provision of a bipolar amplifier which is responsive to the differentiated version of the binary word signal and which is provided with a network circuit for suppressing amplifier response to overshoot appearing in the differentiated version of the binary word signal.

Figure 2:
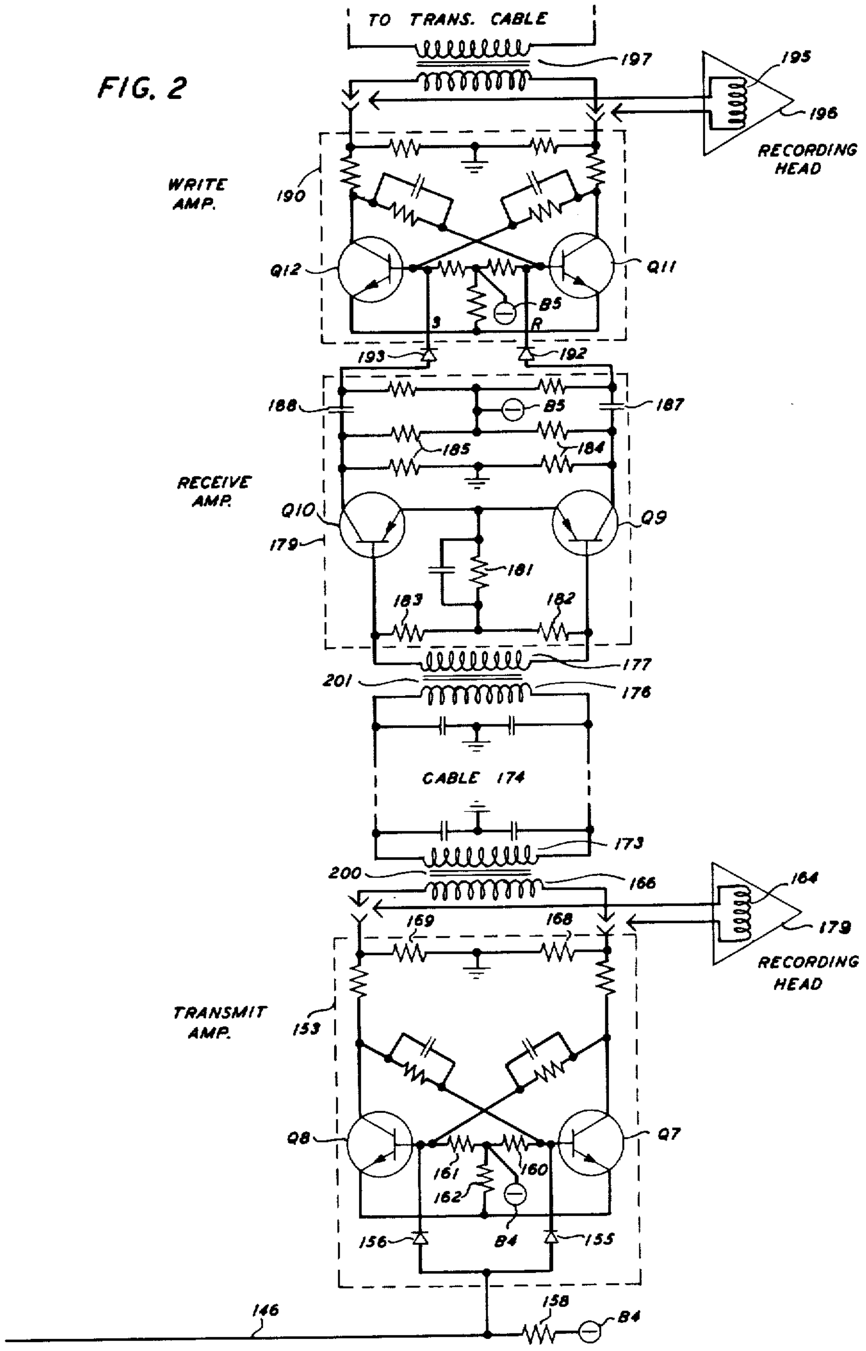
Figure 3:
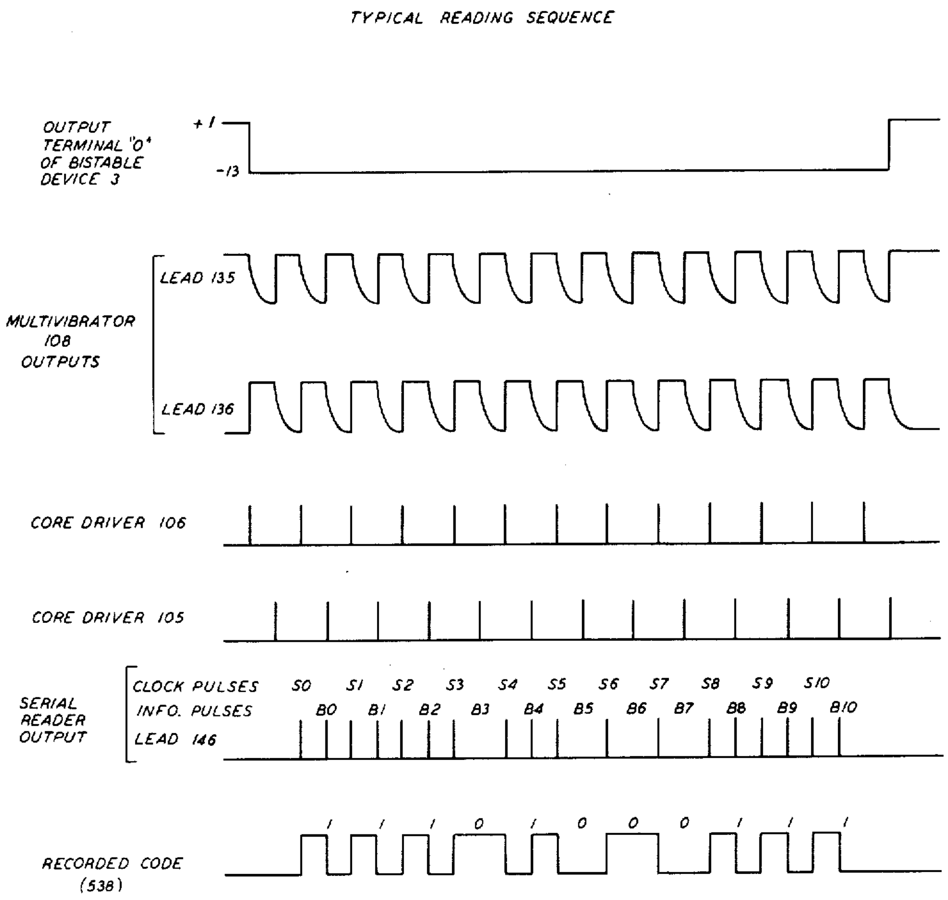

Other objects and features of this invention will become apparent from a consideration of the following detailed description in conjunction with the following drawing wherein FIGS. 1 and 2 show an illustrative embodiment of a parallel-to-serial converter and a recorder apparatus, respectively, in accordance with the principles of this invention and FIG. 3 is a time sequence chart to facilitate an understanding of the operation thereof.

Referring now to FIGS. 1 and 2, the parallel-to-serial converter is operative serially to direct a binary word or notation which has been stored in parallel in the storage cell 1 to the recorder apparatus of FIG. 2; the recorder apparatus of FIG. 2 is, thereupon, operative to serially record such binary word on a magnetic tape medium on a self-clocking nonreturn-to-zero basis for subsequent processing by automatic processing equipment (not shown). More particularly, the storage cell 1 may have stored therein a word in a reflected binay code designating a particular unit of telephone equipment at which has been detected a predetermined condition for purposes of traffic studies. For example, in the D. H. Barnes patent application, Serial No. 1,602, filed on even date herewith, statistical data relevant to the traffic usage of a plurality of units of equipment is encoded in binary form on a one-at-a-time basis and stored in a buffer storage unit. The buffer storage unit, as disclosed in the above-identified D. H. Barnes patent application, comprises a plurality of tandemly arranged storage cells, each cell comprising a plurality of storage elements, and control logic for providing an asynchronous operation thereto. Each binary word is directed in parallel to the first storage cell and through intermediate storage cells in turn to a last storage cell of the buffer storage unit whereat they are available for serial read-out and subsequent recording on a magnetic tape storage medium. Accordingly, in the description hereinafter to be set forth with respect to the illustrative embodiment of this invention, the storage cell 1 and the bistable device 3 are deemed to be identical in all respects to the last storage cell BSN of the buffer storage unit and to the bistable device MVN of the control logic, respectively, of the buffer storage unit as shown in the above-identified D. H. Barnes patent application. The bistable device 3 operates as a memory element for indicating the storage condition of the storage cell 1, i.e., a set condition thereof indicates a storage condition and a reset condition thereof indicates a nonstorage condition of the storage cell 1. Thus, as described in the above-identified D. H. Barnes patent application, the bistable device 3 is set by a negative pulse directed to the set terminal "S" thereof upon a binary word having been completely transferred to and stored in parallel in the storage cell 1.

The storage cell 1 is illustrated as including eleven magnetic cores 5 through 8, 9 through 13 (not shown), 14 and 15 for the storage of a ten-bit binary word plus parity bit. Each of the magnetic cores 5 through 15 has a substantially square-loop characteristic whereby two remanent states of magnetization are provided; one remanent state (set) indicates the storage of a binary "1" and the other remanent state (reset) indicates the storage of a binary "0" in the information bit slot of the equivalent binary word to which the particular magnetic core corresponds. To provide for the storage in parallel of the binary word in the storage cell 1, the magnetic cores 5 through 15 are provided with input windings 17 through 27, respectively, selected ones of which are simultaneously energized as described in the above-identified D. H. Barnes patent application. Also, a sense winding 29 is threaded from ground through each of the magnetic cores 5 through 15 on a single-turn basis and through the resistor 117 to the base electrode of a p-n-p type transistor QI in the pulse amplifier 31. A source B1 is connected to the collector electrode of the transistor QI through the collector load resistor 112. As the emitter electrode of the transistor QI is also connected to ground, the transistor QI is normally in a nonconducting condition. As hereinafter described, the transistor QI is responsive to the voltages developed across the sense winding 29 during a read-out or interrogation of one of the magnetic cores 5 through 15 in which has been stored a binary 1 to develop an information pulse across the collector resistor 112. The magnetic cores 5 through 15 are successively interrogated by a shift register 45 which operates, as hereinafter described, to direct drive or resetting pulses in turn to the read-out windings 33 through 43, respectively.

Included in the pulse amplifier 31 and interpositioned between the sense winding 29 and the base electrode of the transistor QI is a shuttle voltage suppressor circuit, in accordance with an aspect of our invention. The suppressor circuit comprises the serially arranged semiconductor diodes 115 and 116, arranged in parallel with the resistor 117 and a capacitor 118 connecting the junction of the diodes to ground. The capacitor 118 of the suppressor circuit, due to the direction in which the diode 115 is poled, is adapted to be charged through the low impedance of the diode upon the development of a positive voltage across the sense winding 29 as threaded through the cores 5 through 15. Also, the discharge path provided to the capacitor 118, upon having charged, is through the low impedance of diode 116 and resistor 117 along the sense winding 29 as threaded through the cores 5 through 15 to ground; the diode 115 is, at this time, held in a high impedance condition due to the connection of the anode thereof to ground along the sense winding 29. While the capacitor 118 is positively charged, the base electrode of the transistor QI is electrically connected to the capacitor 118 through the low forward impedance of the diode 116; the base electrode of the transistor QI is, therefore, effectively clamped to the instantaneous voltage of the capacitor 118 save for the small drop across the diode. Accordingly, during this time, the effect of the capacitor 118 must be overcome to forward bias the transistor QI. However, when the capacitor 118 is uncharged and upon a negative voltage being developed across the sense winding 29 as threaded through the cores 5 through 15, the suppressor circuit is effectively isolated by the high impedance of the diode 115 and the voltage developed thereacross is directed through the resistor 117 to forward bias the transistor QI.

The two-phase magnetic core shift register 45 for serial reading of the storage cell 1 comprises twenty-six cores 47 through 72 which are paired into thirteen steps; eleven of these steps, i.e., the steps including the magnetic cores 48 through 58 of the phase hereinafter referred to as phase B and the magnetic cores 61 through 71 in the phase hereinafter referred to as phase A, correspond one to each of the magnetic cores 5 through 15 of the storage cell 1. The remaining steps in the shift register 45, i.e., the steps including the magnetic cores 47 and 59 of phase B and the magnetic cores 60 and 72 of phase A, respectively, provide for a time space at the beginning and at the end of each equivalent binary word as recorded on the magnetic tape storage medium, hereinafter described.

In a normalized condition only the magnetic core 60 is in a set condition. The magnetic cores 60 through 72 of phase A are connected through the transfer circuits 74 through 86, respectively, to the magnetic cores 47 through 59, respectively, of phase B in a well-known manner. However, the magnetic cores 47 through 59 of phase B are connected through the transfer circuits 88 through 100, respectively, to the magnetic cores 61 through 72 and the magnetic core 60, respectively. In other words, the magnetic cores 47 through 59 are connected by their respective transfer circuits 88 through 100 to that one of the magnetic cores 61 through 72 and the magnetic core 60, respectively, of phase A which is included in the next successive step of the shift register 45. Further, the transfer 100 connecting the magnetic core 59 of phase B to the magnetic core 60 of phase A is as hereinafter described operative to provide for a recycling and normalizing of the shift register 45 upon each reading-out operation being completed thereby of the storage cell 1. It is to be especially noted that the read-out windings 33 through 43 provided to the magnetic cores 5 through 15, respectively, are included in the transfer circuits 89 through 99, respectively. Accordingly, and as hereinafter more fully described, interogation pulses are directed to the read-out windings 33 through 43 of the cores 5 through 15, respectively, of the storage cell 1 upon the energization of the respective one of the transfer circuits 89 through 99 to transfer the operation of the shift register 45 from phase B to phase A. Further, and as hereinafter more fully described, clock or synchronizing pulses are generated upon each energization of one of the transfer circuits 75 through 85 to transfer the operation of the shift register 45 from phase A to phase B.

To provide for a proper stepping operation of the shift register 45, drive pulses are alternately directed along the drive windings 103 and 102 which are threaded on a single-turn basis through each of the magnetic cores 60 through 72 in phase A and cores 47 through 59 of phase B, respectively, of the shift register 45. The drive windings 103 and 102, as threaded through the magnetic cores 60 through 72 and 47 through 59, respectively, are connected between the negative source B1 and the core drivers 106 and 105, respectively. The core drivers 106 and 105 are controlled by a multivibrator 108 in turn to provide drive pulses along the drive windings 103 and 102, respectively, to transfer the phase of the shift register 45. Accordingly, the peculiar operation of the two-phase shift register 45, as illustrated, is that one of the magnetic cores 47 through 72 included therein is in a set condition and a resetting thereof by a drive pulse directed along that one of the drive windings 103 and 102 threaded therethrough is operative to energize the respective one of the transfer circuits 74 through 86 and 88 through 100 connected therefrom whereby the phase of the shift register is transferred between phase A and phase B and, accordingly, along the successive steps corresponding to the two time spaces and each of the magnetic cores 5 through 15.

Further, a sense winding 110 is threaded on a single-turn basis through each of the magnetic cores 48 through 58 of phase B. The sense winding 110 is connected to lead 120 to form a closed loop which is completed in the pulse amplifier 31 across the emitter-base circuit of the p-n-p type transistor QS. Accordingly, magnetic flux changes in the cores 48 through 58 are effective to develop voltages across the sense winding 110 to alter the biasing condition of the emitter-base junction of the transistor QS. The source B1 is connected to the collector electrode of the transistor QS through the collector load resistor 113. The transistor QS is normally in a nonconducting condition due to the emitter and base electrodes thereof being "shorted" by the sense winding 110. As is hereinafter described, the voltages developed across the sense winding 110 during the setting (counterclockwise flux change) of each of the magnetic cores 48 through 58 is operative to forward bias the transistor QS whereby a clock pulse is provided across the collector resistor 113. As the magnetic cores 48 through 58 are set in turn by the successive operations of the core driver 106, the transistor QS is controlled to provide a succession of clock pulses at a fixed rate at the output thereof which may be advantageously employed in recording the binary word stored in the storage cell 1 on a self-clocking, nonreturn-to-zero basis. It is to be noted that the sense winding 110 is in by-pass of the cores 47 and 59 of phase B to eliminate the appearances of clock pulses during the time spaces which precede and follow the equivalent binary word as recorded on the magnetic tape storage medium.

The emitter electrode of the transistor QS is effectively clamped by lead 120 to the voltage potential appearing at the collector electrode of the transistor Q1 in the core driver 106. During the quiescent state of the core driver 106, the potential appearing at the collector electrode of the transistor Q1 and, also, at the emitter electrode of the transistor QS is determined by the source B1 as connected along the drive winding 103 threaded through the cores 60 through 72 and along lead 120; as the collector electrode of the transistor QS is maintained at a same potential by the voltage source B1 connected through the collector resistor 113, the transistor QS is inoperative as an amplifier device at this time. During the quiescent state of the core driver 106, therefore, the transistor QS is effectively inhibited and no output can be provided therefrom. However, upon each operation of the core driver 106, a ground potential is provided to the emitter electrode of the transistor QS through the low impedance of the emitter-collector circuit of the transistor Q1. Accordingly, the transistor QS is operative as an amplifier device and responsive to voltages developed across the sense winding 110 only during that time in which the core driver 106 is operative and the transistor Q1 is conductive.

In our circuit as described herein, noise pulses on the sense windings due to core shuttling on setting of cores are of the same polarity as the desired pulse information to be obtained on resetting of a core. As such noise pulses are simultaneously induced along a single sense winding threaded through each of the shuttled cores, the effects thereof are additive. It is evident, therefore, that if a sufficient number of magnetic cores are shuttled, the resultant single noise pulse can be mistaken for desired pulse information and provide for an inaccurate parallel-to-serial conversion of an equivalent binary word. The suppressor circuit connected to the sense winding 29 and the base electrode of the transistor QI, and the manner in which the emitter electrode of the transistor QS is maintained at the potential appearing at the collector electrode of the transistor Q1 in the core driver 106 effect a suppression of noise pulses due to core shuttlings and insure an accurate parallel-to-serial conversion of a binary word.

To facilitate an understanding of the following description, a dotted notation is employed at one terminal of each of the windings provided to the magnetic cores of FIG. 1; the polarity of the voltage appearing at the dotted terminal of any winding is the same as the polarity of the voltage applied to the dotted terminal of the winding which is causing the flux change.

For purposes of description, assume that the magnetic cores 5 through 15 of the storage cell 1 are in a reset condition and that a reflected binary code notation equivalent of the decimal number 538 is to be stored in parallel therein. Accordingly, the magnetic cores 5, 6, 7, 9 (not shown), 13 (not shown), 14 and 15 are set to provide for the storage of an equivalent ten-bit reflected binary word plus parity bit. The above-enumerated magnetic cores are set in a conventional manner by initiating a current flow in those transfer circuits including the input windings 17, 18, 19, 21 (not shown), 25 (not shown), 26 and 27 in the low impedance direction of the isolation diodes associated therewith. At this time, a counterclockwise magnetic flux is induced in each of the above-enumerated magnetic cores whereupon each is set according to the equivalent binary word. The counterclockwise magnetic flux in each of the magnetic cores 5, 6, 7, 9 (not shown), 13 (not shown), 14 and 15 produces an increment of voltage across the sense winding 29. It is evident that these induced voltages are additive along the sense winding 29 and develop a positive voltage at the undotted terminal thereof. As the transistor QI is of a p-n-p type, the positive voltage appearing through the resistor 117 at the base electrode is not of proper polarity to forward bias the transistor; the diode device 115, however, is forward biased and the capacitor 118 is charged by this positive voltage. The charging of the capacitor 118 is very rapid due to the short time constant provided thereto. Upon the current through the input windings 17, 18, 19, 21, 25, 26 and 27 ceasing, the magnetic cores which have been set are shuttled to their remanent magnetic states. As is well known, a shuttling of a magnetic core to its remanent state upon cessation of drive current is productive of a decrease of counterclockwise magnetic flux therein. Therefore, each of the selected ones of the cores 5 through 15, upon shuttling, induces increments of voltage which are additive along the sense winding 29. Such voltages are in an opposite direction as those voltages induced during a setting of the selected ones of the cores 5 through 15 and develop a negative potential noise pulse at the undotted terminal of the sense winding 29. Accordingly, if a sufficient number of the cores 5 through 15 are simultaneously set, the noise pulse due to the shuttlings thereof may be of sufficient magnitude to forward bias the amplifier QI and erroneously provide an output therefrom to be mistaken as an information pulse. However, each noise pulse (negative polarity) necessarily follows the appearance of a positive voltage pulse at the undotted terminal of the sense winding 29 upon the setting of the magnetic cores in the storage cell 1. Accordingly, as the capacitor 118 is charged by this positive voltage which is proportionally of greater magnitude than the accompanying noise pulse, the emitter-base junction is clamped or maintained in a reverse-biased condition by the positive charge accumulated across the capacitor 118. The time constant of the above-defined discharge path of the capacitor 118 is provided such that the charge remaining on the capacitor 118 upon the appearance of the accompanying noise pulse is sufficient to maintain the transistor QI in a reverse-biased condition.

As there is a direct relationship between the voltage pulse developed upon the setting of the magnetic cores 5 through 15 and the noise pulses due to a shuttling thereof to their remanent magnetic states, the capacitor 118 is necessarily charged to a larger magnitude of voltage by the former than the magnitude of the resultant noise pulse. Therefore, the time constant of the above-defined discharge path of the capacitor 118 is determined to provide a biasing voltage to the base electrode of the transistor QI whereby the noise pulses are ineffective to forward bias the transistor QI. Accordingly, the shuttle noise suppressor network provides that the transistor QI of the pulse amplifier 31 is not affected by noise pulse due to core shuttling during the storage in parallel of the equivalent binary word in the storage cell 1.

As hereinabove mentioned, the bistable device 3 is provided as a memory device for indicating the storage condition of the storage cell 1. As the bistable device 3 may advantageously comprise a conventional Eccles-Jordan type bistable transistor circuit, a detailed description thereof is not deemed necessary. However, a description of a bistable circuit herein employable may be had by reference to Section 10.6.1, pages 324 through 338 of "Transistor Circuit Engineering," edited by Richard Shea and published by John Wiley, Incorporated, November 1957. Upon the storage in parallel of a binary word in the storage cell 1, a negative pulse is directed to the set terminal "S" of the bistable device 3 which is electrically integral with the base electrode of the p-n-p transistor Q4. Accordingly, the negative voltage pulse so directed is operative to transfer the operational state of the bistable device 3 such that the transistor Q4 is conducting and the transistor Q3 is nonconducting. As is hereinafter described, the bistable device 3 has been previously reset upon a recycling or normalizing of the shift register 45. A negative source B3 is connected to the collector electrodes of the transistors Q3 and Q4 through individual collector load resistors; a positive source B4 is connected to the base electrodes through individual base resistors and to the emitter electrodes through a common emitter resistor. Assuming for purposes of description a source B3 of minus sixteen volts and a source B4 of plus two volts, the voltages appearing at the collector electrodes of the transistors Q3 and Q4 are approximately minus thirteen volts during a nonconducting state and approximately plus one volt during a conductive state thereof. The voltages appearing at the output terminal "0" of the bistable device 3, which is electrically integral with the collector electrode of the transistor Q3, are illustrated in FIG. 3. The output terminal "0" of the bistable device 3 is connected through the semiconductor diode 122 to the multivibrator 108.

The multivibrator 108 may advantageously comprise a conventional type astable or free-running transistor circuit and a detailed description thereof is not deemed necessary. The multivibrator 108, when free-running, provides triggering pulses to the core drivers 105 and 106 along the leads 135 and 136, as illustrated in FIG. 3. The multivibrator 108 is controlled by the bistable device 3 to be operative only during that time in which a binary word is stored in the storage cell 1, i.e., while the bistable device is in a set condition. The multivibrator 108 comprises the transistor devices Q5 and Q6 having the collector electrode of one cross-coupled to the base electrode of the other in a manner such as to effect a free-running operation. The emitter electrodes of the transistors Q5 and Q6 are multiplied to ground while biasing voltages are provided from the source B5 through the resistors 124 and 125 to the collector electrodes of the transistors Q5 and Q6, respectively. The potentiometers 127 and 128 are included in the multivibrator circuit 108 to provide for adjustments in the frequency and balance of the operation thereof. The potentiometer 127 is adapted to equalize differences in the timing networks comprising the capacitor 130 and resistor 131 and capacitor 132 and resistor 133 of the transistors Q5 and Q6, respectively, whereby the two half cycles of the multivibrator output are of equal duration. The potentiometer 128, however, is arranged to provide for the adjustment of the frequency of operation of the multivibrator 108 without disturbing the balanced operation thereof. The potentiometer 128 is adapted so as to be effectively included in the discharge path of either of the capacitors 130 and 132 according to which of the transistors Q5 or Q6, respectively, is conducting.

During the time in which the bistable device 3 is in a reset condition, the potential appearing at the output "0" thereof is approximately plus one volt. As the output terminal "0" of the bistable device 3 is connected to the base electrode of the transistor Q5 of the multivibrator 108 through the diode 122, the base electrode is effectively clamped at plus one volt thereby maintaining a reverse bias on the emitter-base junction of transistor Q5. Accordingly, the transistor Q5 remains nonconductive and the free-running operation of the multivibrator 108 is inhibited. However, upon a setting of the bistable device 3, the voltage appearing at the output terminal "0" thereof decreases to minus thirteen volts whereupon the diode 122 becomes reversed biased and the clamping voltage at the base electrode of the transistor Q5 is removed. Accordingly, the transistor Q5 is now forward biased by the negative potential directed to the base electrode from the source B5 through the potentiometer 127 and the resistor 133. As the multivibrator 108 is provided an astable or free-running operation, it becomes operative to supply triggering pulses alternately to the core drivers 106 and 105 along the output leads 136 and 135, respectively. Referring to the chart in FIG. 3, the series of enabling pulses to the core drivers 106 and 105 along the output leads 136 and 135, respectively, are illustrated.

The core drivers 105 and 106 are illustrated as blocking oscillator circuits comprising p-n-p type transistors Q1 and Q2 which are each provided a regenerative feedback circuit through the pulse transformers T1 and T2, respectively. A complete understanding of the operation of a blocking oscillator of the type herein employable can be had by reference to an article by J. A. Narud and M. R. Aaron entitled, "Analysis and Design of a Transistor Blocking Oscillator Including Inherent Nonlinearities" appearing in the Bell System Technical Journal of May 1959, Vol. XXXVIII, No. 3. The transistor devices Q1 and Q2 are normally maintained in a quiescent or nonconductive state due to the connection of the emitter electrodes thereof through an associated resistor to ground and the connection of a positive source B6 through an associated resistor and the primary windings of the pulse transformers T1 and T2, respectively, to the base electrodes of transistors Q1 and Q2, respectively. Positive excursions of the collector voltages of the transistors Q5 and Q6 are directed to the core drivers 106 and 105, respectively, along the leads 136 and 135, respectively, and are reflected through coupling capacitors included therein as a positive voltage spike or triggering pulse to the center tap of the pulse transformers T1 and T2, respectively; a negative voltage is, therefore, produced at the undotted terminals of the primary winding of the pulse transformers T1 and T2, which voltage is applied to the base electrode of the transistors Q1 and Q2, respectively. Therefore, each of the transistors Q5 and Q6 of the multivibrator 108 is operative upon conduction to forward bias in turn the transistors Q1 and Q2, respectively. Due to the feedback provided through the pulse transformers T1 and T2, the transistors Q1 and Q2 are operative to provide a high current output drive pulse alternately along the drive windings 102 and 103, respectively.

As hereinabove mentioned, during a normalized condition of the shift register 45, only core 60 of phase A is in a set condition. Accordingly, upon the transistor Q5 of the multivibrator 108 becoming conductive, the operation of the core driver 106 and the resulting drive pulse along the drive winding 103 resets the magnetic core 60. The resetting of the magnetic core 60 and the resultant clockwise magnetic flux change produced therein energizes the transfer circuit 74 to effect a setting of the magnetic core 47. As the sense winding 110 is in by-pass of the core 47, no effect thereon is had by the setting of the magnetic core 47 and, accordingly, no output indication is provided from the amplifier QS of the pulse amplifier 31. Such operation provides for the time spaces which are to precede the binary word as recorded on the magnetic tape medium.

Upon the successive transfer of the operational state of the multivibrator 108, i.e., transistor Q6 becoming conductive, the core driver 105 is operated and the resulting drive pulse along the drive winding 102 resets the core 47. The resetting of the magnetic core 47 and the resultant clockwise magnetic flux change produced therein energizes the transfer circuit 88 to effect a setting of core 61 in phase A. While the resultant magnetic flux change produced in the magnetic core 47, at this time, has no inductive effect on the sense winding 110, an inductive effect is realized on the sense winding due to a shuttling of the magnetic cores 48 through 58 through which it is threaded. As a shuttling of each of the magnetic cores 48 through 58 produces a momentary counterclockwise magnetic flux change therein, a negative voltage is developed at the undotted terminal of the sense winding 110 and directed to the base electrode of the transistor QS. However, as the emitter electrode of the transistor QS is clamped via lead 120 to the collector electrode of the transistor Q1 of the core driver 106, the transistor QS is effectively inhibited as an amplifier device and no output pulse appears therefrom at this time. In this manner, therefore, noise pulses due to core shuttlings produced along the sense winding 110 upon each transfer of the shift register 45 from phase B to phase A are suppressed.

Upon the next successive transfer of operational state of the multivibrator 108, i.e., transistor Q5 becoming conductive, the core driver 106 is operated and the resulting drive pulse along the drive winding 103 resets the magnetic core 61 in phase A. The resetting of the magnetic core 61 and the resultant clockwise flux change produced therein energizes the transfer circuit 75 to affect a setting of the magnetic core 48 in phase B. As the sense winding 110 is threaded through the magnetic core 48, the resultant counterclockwise magnetic flux change produced therein develops a negative voltage at the dotted terminal of the sense winding which is directed to the base electrode of the transistor QS of the pulse amplifier 31. As the transistor Q1 of the core driver 106 is conductive at this time, the transistor QS is not inhibited as an amplifier device and an output pulse is developed across the collector load resistor 113. This output pulse so developed corresponds to the first sync pulse SO in the chart seen in FIG. 3.

On the next successive transfer of operational state of the multivibrator 108, i.e., transistor Q6 becoming conductive, the core driver 105 is operated and the resulting drive pulse along the drive winding 102 resets the magnetic core 48 and the resultant clockwise flux induced therein energizes the transfer circuit 89. The transfer circuit 89 is effective not only to set the magnetic core 62 but, also, to interrogate the remanent magnetic state of the magnetic core 5 in the storage cell 1. As illustrated, the transfer circuit 89 includes the read-out winding 33 and is, accordingly, operative to interrogate or reset the magnetic core 5. As the magnetic core 5 has hereinabove been assumed to be set, an interrogation thereof produces a clockwise magnetic flux change therein to develop a negative voltage at the undotted terminal of the sense winding 29. The capacitor 118 has at this time discharged sufficiently whereby the negative potential provided to the base electrode of the transistor QI through the resistor 117 is sufficient to initiate conduction therethrough. Accordingly, an output pulse is developed across the collector resistor 112; the pulse corresponds to the first information pulse BO in the chart seen in FIG. 3. Upon a resetting, the shuttling of the core 5 is again productive of a momentary counterclockwise magnetic flux change therein. This resultant magnetic flux change is productive of a small positive voltage at the undotted terminal of the sense winding 29 which serves only to reverse bias the transistor QI.

Upon successive transfers in the operational states of the multivibrator 108, therefore, the core drivers 106 and 105 are alternately triggered to direct drive pulses along the drive windings 103 and 102, respectively. As the transfer circuits 89 through 99 are identical in that they include the drive windings 33 through 43, respectively, which are provided to the magnetic cores 5 through 15 of the storage cell 1, it is evident that each of the magnetic cores 5 through 15 is interrogated in turn by the stepping operation of the shift register 45. Accordingly, information pulses are developed across the collector resistor 112 of transistor QI in a time sequence corresponding to the appearance of a binary "1" in the information bit slots of the equivalent binary word to which the set ones of the magnetic cores 5 through 15 correspond, respectively. As is well known, the interrogation of one of the magnetic cores 5 through 15 which has not been set upon the storage in parallel of the equivalent binary word in the storage cell 1, e.g., magnetic core 8, is productive of only a noise pulse due to the shuttling thereof upon interrogation, which noise pulse is singly ineffective to forward bias the transistor QI for providing a pulse output across the collector resistor 112. Accordingly, due to the peculiar operation of the transfer circuits 89 through 99, information pulses when developed across the collector resistor 112 of the transistor QI appear at a time intermediate the development of clock pulses across the collector resistor 113 of the transistor QS upon each operational transfer from phase B to phase A by the shift register 45.

Continuing the sequence of the operation of the shift register 45 as hereinabove detailed, the magnetic core 15 of the storage cell 1 is interrogated upon the resetting of the magnetic core 58 of phase B by the operation of the core driver 105; the resultant clockwise magnetic flux change produced in the magnetic core 58 energizes the transfer circuit 99 to both set the magnetic core 72 of phase A and interrogate the magnetic core 15. Accordingly, the next successive transfer of operational state of the multivibrator 108, i.e., transistor Q5 becoming conducting, the core driver 106 is operated and the resultant drive pulse along the drive winding 103 resets the magnetic core 72; the resulting clockwise magnetic flux change produced in the magnetic core 72 energizes the transfer circuit 86 to set the magnetic core 59 of phase A. However, as the sense winding 110 is not threaded through the magnetic core 59, no inductive effect thereby is had on the sense winding, and, accordingly, no clock pulse is developed across the collector resistor 113 of the transistor QS at this time.

To avoid a mutilation of the next subsequent binary word to be converted, it is necessary that the serial reader apparatus of FIG. 1 be normalized or inhibited during that time in which such word is being stored in parallel in the magnetic cores 5 through 15 of the storage cell 1. Accordingly, upon the next successive transfer of operational state of the multivibrator 108, i.e., transistor Q6 becoming conductive, the core driver 105 is operated and the resultant drive pulse along the drive winding 102 resets the magnetic core 59 of phase B and the resultant clockwise magnetic flux change produced therein energizes the transfer circuit 100. The energization of the transfer circuit 100, which can be traced to include the output winding of the magnetic core 59 and the input winding of the magnetic core 60 in phase A, results in the setting of the latter core. The setting of the magnetic core 60 is productive of a counterclockwise magnetic flux change therein which develops a negative voltage at the dotted terminal of the output winding 144 provided thereto which is included in the transfer circuit 74; an energization of the transfer circuit 74 is effectively inhibited by the isolation diode provided therein. However, this negative voltage appears along the lead 141, which is connected at the dotted terminal of the output winding 144, through the resistor 142 and is reflected as a negative pulse to the reset terminal "R" of the bistable device 3. The reset terminal "R" of the bistable device 3 is electrically integral with the base electrode of the transistor Q3. The negative pulse so directed is of sufficient magnitude to forward bias the transistor Q3 whereupon the operational state of the bistable device 3 is transferred; the voltage appearing at the output terminal "0" of the bistable device 3 now rises abruptly from minus thirteen volts to plus one volt. Accordingly, the diode 122 is now forward biased to inhibit the free-running operation of the multivibrator 108. The shift register 45 is, therefore maintained inoperative or normalized so long as the bistable device 3 is maintained in a reset condition. As described in the above-identified D. H. Barnes patent application, the resetting of the bistable device 3 and the accompanying decrease in potential at the output terminal "1" thereof which is electrically connected to the collector electrode of the transistor Q4 can be used to initiate the transfer in parallel of the next subsequent word to the storage cell 1.

To provide for a recording of the binary word equivalent of the decimal number 538 on a self-clocking nonreturn-to-zero basis, as illustrated in the bottom line of FIG. 3, the information pulses developed across the collector resistor 112 of the transistor QI and the clock pulses developed across the collector resistor 113 of the transistor QS are directed in time sequence along the lead 146 to the recorder apparatus of FIG. 2. The collector resistors 112 and 113 of the transistors QI and QS, respectively, are connected to the anodes of the diode devices 138 and 139, respectively, in the OR gate 151; the cathodes of the diode devices 138 and 139 are multipled through the resistor 148 to the negative source B1 and connected to the lead 146 through the coupling capacitor 149. Accordingly, the information pulses and the sync pulses are directed through the OR gate 151 and appear in time sequence as a succession of positive pulses along the lead 146. The output of the OR gate 151 is shown in FIG. 3 as the serial reader output wherein the individual information and clock pulses are identified as B-numbered pulses and S-numbered pulses, respectively. The absence of B3 and B5 through B7 in the serial reader output shown in FIG. 3 is due to the fact that the magnetic cores 8 and 10 through 12 of the storage cell 1 were not set upon the storage of the reflected binary word equivalent of the decimal number 538.

The pulses appearing in turn at the output of the OR gate 151 are reflected through the capacitor and along the lead 146 to the input of the transmitter amplifier 153. The transmitting amplifier is essentially a Eccles-Jordan type bistable circuit comprising the n-p-n transistors Q7 and Q8 modified by the addition of a binary-counter type input well known in the art to transfer operational states upon the appearance of a positive pulse at the single input terminal thereof. The binary counter type input provided to the transmitting amplifier 153 comprises the semiconductor diode devices 155 and 156, the anodes of which are multipled directly to the lead 146 and through the resistor 158 to the negative source B4. The cathodes of the diode devices 155 and 156, on the other hand, are connected to the base electrodes of the transistors Q7 and Q8, respectively. Necessary cross-coupling arrangements are provided between the collector electrodes of each of the transistors Q7 and Q8 and the base electrodes of the other of the transistors to provide a bistable operation to the transmitting amplifier 153. The negative source B4 is connected as a source of biasing voltage through the resistors 160 and 161 to the base electrodes of the transistors Q7 and Q8, respectively, and through a common emitter resistor 162 to the emitter electrodes of transistors Q7 and Q8. The collector electrodes of each of the transistors Q7 and Q8 are connected through the collector load resistors 167 and 168 and 169 and 170, respectively to ground. As one of the transistors Q7 and Q8 is necessarily conductive at any one time, it is evident that the voltages appearing at the base electrode of the transistors Q7 and Q8 are slightly less negative than the source B4 whereby the diodes 155 and 156, respectively, are normally maintained in a reverse-biased condition. Upon each appearance of a positive pulse at the input of the transmitting amplifier 153, both of the diodes 155 and 156 become forward biased and the pulse is simultaneously applied therethrough to the base electrodes of the transistors Q7 and Q8, respectively. The positive pulse so directed is effective to forward bias the emitter-base junction of that one of the transistors Q7 or Q8 which is presently nonconducting thereby causing it to conduct, whereupon a large negative signal is coupled to the base electrode of the other of the transistors sufficient to overcome the biasing effect of the positive pulse now applied to the base electrode thereof and, also, reverse bias the other of the transistors whereby the operational state of the transmitting amplifier 153 is transferred.

The transmitter amplifier 153 is particularly adapted to provide a reversible current output to a recording head winding 164 of a recorder head 179 when a recording of the equivalent binary word is to be made locally or to the primary winding 166 of a voice-band transformer 200 when the binary word is to be transmitted to and recorded at a distant location. Accordingly, optional connections are provided to the junctions of the collector resistors 167 and 168 and, also 169 and 170 whereby the recording head winding 164 of the recorder head 179 or the primary winding 166 of the transformer 200 is effectively arranged in parallel with the collector resistors 168 or 169 upon conduction in either of the transistors Q7 or Q8, respectively. It is evident, therefore, that a reversal of current is realized through the connected one of the recording head winding 164 or the primary winding 166 upon a transfer in operation of the transmitter amplifier 153.

With respect to the recording head winding 164, the provision of current reversal therethrough is productive of a reversal of magnetic flux which is developed axially therein and concentrated by the associated recording head 179. Accordingly, magnetic density discontinuities, either positive or negative, are provided longitudinally along a magnetic tape medium passing in close proximity to the recording head 179 which are indicative of each transfer in operational state of the transmitter amplifier 153 in response to a positive pulse, i.e., an information pulse or a sync pulse. The manner in which information is recorded on a self-clocking nonreturn-to-zero basis along a magnetic tape medium is well known in the art and a detailed description thereof is not deemed necessary. It is sufficient for purposes of this description that the manner in which current flow provided through the recording head winding 164 is reversed to provide for the above-mentioned discontinuities along a magnetic tape medium has been detailed. The recording of the reflected binary word equivalent of the decimal number 538 on a nonreturn-to-zero basis is shown in FIG. 3 as the recorder output wherein the magnetic density discontinuities are indicated by the sharp vertical changes between the two levels or degrees of magnetization.

On the other hand, if the optional connections are made to the terminals of the primary winding 166 of the transformer 200, each transfer in operational state of the transmitter amplifier 153 affects a reversal of the current flow therein. This reversal of current flow in the primary winding 166 produces an induced current flow in the secondary winding 173 thereof which is connected to a transmission cable 174. In transmission along the cable 174, the equivalent binary word is not transmitted in the usual pulse form but rather is transmitted as a series of alternate abrupt changes of a closed loop current along the cable 174. This is evidenced as the cable 174 is in effect a closed current loop continuous through the secondary winding 173 of the transformer 200 and the primary winding 176 of the transformer 201, hereinafter referred to as a current loop. During such time, therefore, that an equivalent binary word is not being transmitted, the current loop is in a normal condition having no current flow therein. Also, this normal condition is present along the current loop if the operational state of the transmitter amplifier 153 has not been transferred for an extended time. This is clear as the current flow through the primary winding 166 of the transformer 200 is not presently changing and, accordingly, a current is not being induced in the secondary winding 173 thereof.

However, upon a transfer of operational state of the transmitter amplifier 153 upon a positive pulse being directed thereto along the lead 146, there is a sudden reversal in current flow through the primary winding 166 which is productive of an induced current flow in the secondary winding 173 and, accordingly, along the current loop through the primary winding 176 of the transformer T2. The initiation of current flow through the loop at this time is very abrupt, but, upon the current flow through the primary winding 166 of the transformer 200 stabilizing, the generator effect of the secondary winding 173 thereof ceases and current loop tends to normalize. However, due to the distributed parameters along the length of the cable 142, herein illustrated as stray capacitance to ground, the normalization of the cable is delayed. Therefore, the initiation of current flow along the current loop is abrupt in either direction, as determined by the direction of change of current flow through the primary winding 166 of the transformer 200, while the normalization of the current loop is delayed due to the distributed parameters appearing therealong.

Accordingly, each transition of the closed loop current induced by the reversal of current through the primary winding 166 of the transformer 200, while not necessarily occurring while the closed loop is in a normal current condition does produce an approximately equal deviation, either positive or negative polarity, from the existing instantaneous current condition therein. Thus, the equivalent reflected binary word is transmitted along the closed loop as a succession of abrupt changes of alternating polarities in the current conditions therealong resulting from each reversal of current flow through the primary winding 166 of the transformer 200; the degree and rate of change of these abrupt changes in the current conditions are fairly uniform. By employing a relatively low inductance transformer 201 a differentiated version of the currents appearing along the closed loop is had. The low inductance transformer 201 acts essentially as a differentiator device which is more sensitive to the abrupt changes in the closed loop current than to the slower changes thereof. Accordingly, during the more abrupt changes in closed loop current through the primary winding 176 of the low inductance transformer 201, alternate positive and negative voltages are developed across the secondary winding 177 of greater magnitudes than are developed during the slower changes in the closed loop current. The slower changes in the closed loop current due to the tendency of the loop current to normalize when not being excited appear as smaller magnitude voltages of opposite polarity which are, in effect, overshoots of the larger voltages. Satisfactory results have been obtained by employing a 1:1 ratio transformer 201 with a winding inductance of 70 millihenries where the binary data is transmitted at a 600 bit-per-second rate over 19-gauge cable lengths from 0 to 20 miles.

The terminals of the secondary winding 177 are connected to the base electrodes of the p-n-p transistor amplifiers Q9 and Q10, respectively, which comprise the bipolar receiving amplifier 179. The transistors Q9 and Q10 are adapted to be alternately rendered conductive upon successive abrupt changes in the closed loop current through the primary winding 176 of the transformer 201. The bipolar amplifier 179 is employed as each of the abrupt positive and negative changes is indicative of successive ones of the pulses directed along the lead 146 which represent the equivalent binary word in a self-clocking nonreturn-to-zero form. The emitter electrodes of the transistors Q9 and Q10, respectively, are multipled to ground. Biasing potentials are provided from the negative source B5 to the collector electrodes of each of the transistors Q9 and Q10 by the voltage dividing networks 184 and 185, respectively. Each of the transistors Q9 and Q10 is maintained in a normally nonconducting state due to the ground potential which is provided to both the emitter and base electrodes thereof, such potential being provided to the latter through the common resistance-capacitance network 181 and the individual resistors 182 and 183, respectively. As successive ones of these closed loop current changes are of opposite polarity, a negative voltage is produced by each such change at first one and then the other of the terminals of the secondary winding 177.

That one of the transistors Q9 and Q10 whose base electrode is connected to the one terminal of the secondary winding 177 at which the negative voltage presently appears is rendered conductive. Similarly, the positive voltage which is simultaneously produced at the other terminal of the secondary winding 177 is effective to reverse bias the other of the transistors Q9 and Q10 whose base electrode is connected thereto. The network 181 serves as a bias network for suppressing any response to the overshoot of the larger pulses developed across the secondary winding 173 by the bipolar amplifier 179. During conduction in one of the transistors Q9 and Q10, the capacitor of the network 181 charges to the polarity indicated thereon; upon conduction through the one transistor ceasing, the capacitor is discharged through the parallel resistor to furnish a temporary reverse biasing potential to each of the transistors during the appearances of the overshoots of the larger pulses. Therefore, the equivalent binary word which appeared along the lead 146 as a succession of time directed pulses now appears across the secondary winding 177 as a corresponding succession of positive and negative voltages corresponding to the time directed pulses, the voltages appearing at the respective terminals of the secondary winding being phase displaced by 180 degrees. It is evident, therefore, that conductions of each of the transistors Q9 and Q10 upon each development of a negative voltage at the respective connected terminal of the secondary winding 177 also correspond in time to the pulses directed along the lead 146.

Accordingly, to provide for the recording on a self-clocking nonreturn-to-zero basis of the equivalent binary word so transmitted, the write amplifier 190 is provided. The collector electrodes of the transistors Q9 and Q10 are connected through the coupling capacitors 187 and 188, respectively, and the diodes 192 and 193, respectively to the reset terminal "R" and the set terminal "S" of the write amplifier 190. The write amplifier 190 may advantageously comprise a bistable circuit arrangement comprising the n-p-n transistors Q11 and Q12 which is identical to the transmitting amplifier 153, hereinabove described, but for the fact that a set terminal "S" and reset terminal "R" are provided thereto rather than a binary type input. The operation of the write amplifier 190, therefore, is identical to the operation of the transmitter amplifier 153 which has been hereinabove detailed but for the fact that triggering pulses are alternately directed through the diodes 192 and 193 to the set terminal "S" and the reset terminal "R," respectively. Accordingly, upon conduction in one of the transistors Q9 or Q10 of the bipolar amplifier 179, the resultant position change in the collector voltage thereof is reflected through the respective one of capacitors 188 and 189 as in enabling pulse through the respective one of the diodes 192 and 193 to the base electrode of the respective one of transistors Q11 and Q12. Accordingly, the operational state of the write amplifier 190 is transferred upon the initiation of conduction through alternate ones of the transistors Q9 and Q10 of the receiving amplifier 179. In addition, optional connections, as described hereinabove with respect to the transmitter amplifier 153, are provided to the collector circuits of the transistors Q9 and Q10 whereby a reversible current output can be provided either to the recording head winding 195 of a recording head 196 if an immediate recording is to be made of the equivalent binary word or the primary winding of a transformer 197 if the equivalent binary word is to be further directed along another transmission cable, also not shown, for recording at a more distant location.

It is to be understood that the above-described arrangements are merely illustrative of the application of the principles of our invention, and that numerous other arrangements may be devised by those skilled in the art without departing from the spirit and scope of our invention.

What is claimed is:

1. A parallel-to-serial converter comprising a word organized storage cell comprising a plurality of square-loop magnetic core devices adapted to be selectively set in parallel in accordance with a binary word, each setting of one of said magnetic cores being productive of a first directional magnetic flux change and a second directional magnetic flux change therein, sensing means inductively coupled to each of said magnetic cores such that the voltages developed there-across due to each of said flux changes are additive, amplifier means normally responsive to the voltages developed across said sensing means due to said second directional flux changes, and suppressor means responsive to the voltages developed across said sensing means due to said first directional flux changes to temporarily inhibit said amplifier means during the time period of development of said voltage due to said second directional flux change across said sensing means on setting of said cores.

2. A converter and output circuit comprising a first plurality of magnetic cores in which information is stored in parallel, a second plurality of magnetic cores arranged in two groups in a shift register circuit, each of said first and second plurality magnetic cores having two stable states of remanence, means for alternately pulsing said two groups of magnetic cores in said shift register, first coupling means connecting one group of said second plurality of magnetic cores to the other group of said second plurality, second coupling means connecting said other group magnetic cores to said one group magnetic cores and to said first plurality magnetic cores, a first sense winding threaded through each of said first plurality magnetic cores, a second sense winding threading certain of said other group magnetic cores, and pulse detector means connected to said first and second sense windings.

3. A converter and output circuit in accordance with claim 2 further comprising means connected to said first sense winding for preventing operation of said detector means on shuttling signals in said first plurality cores, said last-mentioned means including a capacitor connected to said sense winding, means for charging said capacitor rapidly on pulses of one polarity on said sense winding and means for discharging said capacitor slowly during pulses of the opposite polarity on said sense winding occurring immediately after said pulses of said one polarity due to shuttling of said cores.

4. In a parallel-to-serial converter apparatus, a word organized storage cell comprising a plurality of square-loop magnetic cores adapted to be selectively set in parallel in accordance with a binary word, each setting of one of said magnetic cores being productive of a first direcional magnetic flux change and a second directional magnetic flux change therein, said second directional magnetic flux change resulting from shuttlings of said storage cell magnetic cores, sensing means inductively coupled to each of said magnetic cores whereby the voltages developed thereacross due to each of said flux changes are additive, transistor amplifier means normally responsive to the voltages developed across said sensing means due to said second directional flux changes, means including said sensing means for maintaining said transistor amplifier means in a nonconductive condition, and suppressor means responsive to the voltages developed across said sensing means due to said first directional flux changes to reverse bias said transistor amplifier means, said suppressor means including timing means for determining the operation of said suppressor means sufficient to insure a nonoperation of said amplifier means during said second directional flux changes due to setting of said cores.

5. A parallel-to-serial converter and output circuit comprising a plurality of magnetic cores each having two stable states of remanent magnetization, means for setting said cores to store information in said cores in parallel, means for resetting said cores in succession to read out said information serially, a common sense winding threading said cores, detector means connected to said sense winding and enabled on appearance of a pulse of one polarity thereon on resetting of one of said magnetic cores, and means for preventing enablement of said detecting means by shuttling pulses due to setting of said cores, said preventing means including a capacitor connected to said sense winding, means for charging said capacitor rapidly on appearance of a pulse of opposite polarity on said sense winding due to setting of said cores, and means for preventing rapid discharging of said capacitor on subsequent appearance of a pulse of said one polarity due to shuttling of said cores after setting thereof.

6. A parallel-to-serial converter and output circuit in accordance with claim 5 wherein said sense winding is connected to said detector means by a pair of serially connected, similarly poled diodes and a resistor in shunt with said diodes, said diodes being poled for passage to said detector means of pulses of said other polarity and said capacitor being connected to the connection between said diodes.

7. A parallel-to-serial converter comprising a word organized storage cell comprising a plurality of square-loop magnetic cores adapted to be selectively set in parallel in accordance with a binary word, means operative upon a binary word being stored in said storage cell to successively interrogate each of said magnetic cores, said interrogating means including a two-phase magnetic core shift register having a plurality of steps corresponding one to each of said storage cell magnetic cores and including a plurality of transfer circuit means connecting successive ones of said steps, read winding means provided to each of said storage cell magnetic cores and included in that one of said transfer circuits connecting said step corresponding thereto and said next successive step, and pulse generating means inductively coupled to said storage cell magnetic cores and to said shift register.

8. In a parallel-to-serial converter, a word organized storage cell comprising a plurality of square-loop magnetic cores adapted to be selectively set in parallel in accordance with a binary word, means for successively interrogating each of said storage magnetic cores, said interrogating means including a two-phase magnetic core shift register having a plurality of steps corresponding one to each of said storage magnetic cores and including a plurality of transfer means connecting successive ones of said steps, drive winding means provided to each of said storage magnetic cores and included in that one of said transfer circuits connecting said step corresponding thereto and said next successive step, first pulse generating means inductively coupled to each of said storage cell magnetic cores for providing an information pulse upon each interrogation of a set one thereof, and second pulse generating means for providing a clock pulse prior to each interrogation of said storage cell magnetic cores, said second pulse generating means including a sense winding inductively coupled to the magnetic cores included in one phase of said two-phase shift register.

9. In a parallel-to-serial converter in accordance with claim 8 further including normally operative means for controlling the operation of said interrogating means, bistable memory means having a first and second operating condition, said memory means being operative in said second operating condition to inhibit said normally operative means, and means operative upon each storage cell magnetic core having been successively interrogated to transfer said memory means to said second operating condition.

10. A parallel-to-serial converter and output circuit comprising a first plurality of magnetic cores having information stored therein in parallel, a shift register circuit including a second and a third plurality of magnetic cores, each of said magnetic cores having a substantially rectangular hysteresis loop, means for alternately pulsing said second and third pluralities of magnetic cores, first coupling means interconnecting said third and said second pluralities of magnetic cores, second coupling means interconnecting said second, third, and first pluralities of magnetic cores, a common output lead, and means for transferring information and synchronizing pulses to said output lead, said last mentioned means including a first detector means, a first sensing winding linking said first plurality of magnetic cores and connected to said first detector means, a second detector means, a second sensing winding linking at least certain ones of said second plurality of magnetic cores and connected to said second detector means, and means connecting the outputs of said first and second detector means to said common output lead.

11. A parallel-to-serial converter and output circuit in accordance with claim 10 wherein said first and second detector means comprise first and second transistors, respectively, having base, emitter, and collector electrodes, said first sensing winding being connected to said first transistor base electrode, said second sensing winding being connected to said second transistor base electrode, and said common output lead being connected by said connecting means to said collector electrodes.

12. A parallel-to-serial converter and output circuit in accordance with claim 11 further comprising means connecting said second transistor emitter electrode to said alternate pulsing means for preventing conduction of said second transistor on pulsing of said third plurality of magnetic cores.

13. In a parallel-to-serial converter apparatus, a word organized storage cell comprising a plurality of square-loop magnetic core devices adapted to be selectively set in parallel in accordance with a binary word, means for successively interrogating each of said storage cell magnetic cores, said interrogating means including a two-phase shift register comprising a plurality of first phase and second phase magnetic cores, corresponding ones of said first phase and second phase magnetic cores arranged in steps corresponding one to each of said storage cell magnetic cores, first transfer means connecting corresponding ones of magnetic cores in each of said steps for transferring the phase of said shift register, second transfer means connecting said second phase magnetic cores in one of said steps to said first phase magnetic core in a next successive one of said steps and including drive winding means for interrogating said storage cell magnetic core corresponding to said one step, first means for applying alternate drive pulses to said first phase and second phase cores for stepping said shift register whereupon each of said storage cell magnetic cores is successively interrogated, normally operative means for controlling said alternate drive means, and means for inhibiting said normally operative means during a nonstorage condition of said storage cell.

14. In a parallel-to-serial converter, a word organized storage cell comprising a plurality of square-loop magnetic core devices adapted to be selectively set in parallel in accordance with a binary word, memory means having a first and a second operating condition for indicating a storage condition and a nonstorage condition, respectively, of said storage cell, normally operative means for successively interrogating each of said storage cell magnetic cores, means including said memory means in said second operating condition for inhibiting said interrogating means, said interrogating means including a two-phase magnetic core shift register comprising a plurality of pairs of magnetic cores arranged in steps corresponding one to each of said storage cell magnetic cores, first transfer means connecting each of said pairs of magnetic cores in each of said steps, second transfer means connecting each step to a next successive one of said steps and including drive winding means for interrogating said storage cell magnetic core corresponding to said each step, additional transfer means connecting the last one of said steps to the first one of said steps of said shift register for providing a recycling operation thereto, pulse amplifier means inductively coupled to said storage cell magnetic cores and the magnetic cores in one phase of said two-phase magnetic cores for providing a pulse indication upon each interrogation of a set one of said storage cell magnetic cores and upon each transfer of said shift register by said first transfer means, and control means responsive to said additional transfer means for providing a second operating condition to said memory means.

15. A parallel-to-serial converter comprising a storage cell comprising a plurality of magnetic cores, a two-phase shift register comprising a plurality of first phase magnetic core and second phase magnetic cores arranged in steps corresponding one to each of said storage cell magnetic cores, first means responsive to each transfer between a first and a second phase magnetic core in one of said steps to provide a first pulse indication, means operative upon said shift register being advanced from one of said steps to the succeeding step for interrogating said storage cell magnetic core corresponding to said one step, second means responsive to an interrogation of a set one of said storage cell magnetic cores to provide a second pulse indication, and serial recording means responsive to said first and said second means.

16. In a parallel-to-serial converter apparatus, a storage cell comprising a plurality of square-loop magnetic cores, memory means for indicating the storage condition of said storage cell, a two-phase shift register comprising a plurality of first phase and a second phase square-loop magnetic cores, astable means for operating said two-phase magnetic core shift register, means including said memory means for inhibiting said astable means during a nonstorage condition of said storage cell, means including said two phase magnetic core shift register for successively interrogating said plurality of storage cell magnetic cores, and means including said shift register for transferring the operational state of said memory means upon each of said plurality of said storage cell magnetic cores having been interrogated.

17. In a parallel-to-serial converter apparatus, a storage cell comprising a plurality of square-loop magnetic cores, said plurality of said storage cell magnetic cores adapted to be selectively set in accordance with a binary word, first sensing means inductively coupled to each of said cores, a setting of each of said plurality of storage magnetic cores being productive of a first directional magnetic flux change and a second directional magnetic flux change therein, said second directional magnetic flux change resulting from core shuttling, said first and said second magnetic flux changes combining to develop a first voltage and a second voltage across said sensing means, first amplifier means responsive to said first sensing means upon the developing of said second voltage, first means responsive to said sensing means on the development thereacross of said first voltage for maintaining said first amplifier means in a disabled condition during such time that said second voltage is developed thereacross immediately following said first voltage, means including a two-phase magnetic core shift register for successively interrogating said plurality of storage cell magnetic cores, said shift register including a plurality of first phase and second phase magnetic cores, second sensing means inductively coupled to certain ones of said second phase magnetic cores, first drive means including said first phase magnetic cores for successively providing a first directional magnetic change in each of said second phase magnetic cores, said first directional change in each of said second phase magnetic cores developing a first voltage across said second sensing means, second amplifier means responsive to said second voltage developed across said second sensing means, second drive means for producing a second directional magnetic flux change in each of said second phase magnetic cores, and transfer circuit means responsive to said second phase magnetic cores upon the development of said second directional magnetic flux change to successively interrogate said storage cell magnetic cores, an interrogation of a set one of said storage cell magnetic cores being productive of a second directional magnetic flux change therein.

18. In a parallel-to-serial converter, a word organized storage cell including a plurality of square loop magnetic cores adapted to be selectively set in accordance with a binary word, memory means having a first and a second operating condition for indicating the storage and the nonstorage condition, respectively, of said storage cell, normally operative means for successively interrogating each of said storage cell magnetic cores, means including said memory means in said second operating condition for inhibiting said interrogating means, said interrogating means including a two-phase shift register device having a plurality of first phase and second phase magnetic cores, first means including said first phase magnetic cores for providing a first directional magnetic flux change in successive ones of said second phase magnetic core, second means for providing a second directional magnetic flux change in said successive ones of said second phase magnetic cores, transfer circuit means connecting corresponding ones of said storage cell magnetic cores and said second phase magnetic cores and adapted to be energized upon said first directional magnetic flux change for interrogating said corresponding storage magnetic core, first amplifier means inductively coupled to each of said storage cell magnetic cores for providing an indication upon each interrogation of a set one thereof, second amplifier means inductively coupled to each of said second phase magnetic cores for providing an indication upon a second directional flux change in said successive ones of said second phase magnetic cores, first control means and second control means for alternately operating said first and said second means, and means including said first control means for inhibiting the operation of said second amplifier means during the operation of said first control means.

19. A parallel-to-serial converter as set forth in claim 18 further including means for maintaining said first amplifier means in a nonresponsive state to shuttling signals upon said storage cells having been selectively set.

20. A converter and output circuit comprising a first plurality of magnetic cores in which information is stored in parallel, a second plurality of magnetic cores arranged in two groups in a shift register circuit, each of said first and second pluralities of cores having two stable states of remanence, means for alternately pulsing said two core groups, first coupling means connecting one of said core groups to the other core group, second coupling means connecting said other core group to said one core group and to said first plurality of cores, a first sense winding threaded through each of said first plurality of cores, a second sense winding threading certain of said other core group, pulse detector means including a first transistor connected to said first sense winding and a second transistor connected to said second sense winding, and means for connecting said second transistor to said means for alternately pulsing said two core groups for inhibiting said second transistor during pulsing of said other core group.

References Cited in the file of this patent

UNITED STATES PATENTS

| | | |
|---|---|---|
| 2,882,517 | Warren | Apr. 14, 1959 |
| 2,911,622 | Ayers | Nov. 3, 1959 |
| 2,947,977 | Block | Aug. 2, 1960 |
| 2,957,163 | Kodis | Oct. 18, 1960 |